(12) United States Patent
Kashine

(10) Patent No.: US 6,772,314 B2
(45) Date of Patent: Aug. 3, 2004

(54) DATA PROCESSING DEVICE

(75) Inventor: Takashi Kashine, Suwa (JP)

(73) Assignee: Seiko Epson Corporation (JP)

(*) Notice: Subject to any disclaimer, the term of this patent is extended or adjusted under 35 U.S.C. 154(b) by 253 days.

(21) Appl. No.: 10/038,536

(22) Filed: Jan. 2, 2002

(65) Prior Publication Data
US 2002/0112115 A1 Aug. 15, 2002

(30) Foreign Application Priority Data
Jan. 5, 2001 (JP) .................................. 2001-000385

(51) Int. Cl.⁷ .............................................. G06F 12/02
(52) U.S. Cl. ..................... 711/202; 711/103; 711/165
(58) Field of Search ................. 711/103, 165, 711/202

(56) References Cited
U.S. PATENT DOCUMENTS
2001/0012975 A1 * 8/2001 Matsumoto ................. 700/231

FOREIGN PATENT DOCUMENTS
| JP | 08-263281 | 10/1996 |
| JP | 10-247187 | 9/1998 |
| JP | 10-333898 | 12/1998 |

* cited by examiner

Primary Examiner—Jack A. Lane
(74) Attorney, Agent, or Firm—Harness, Dickey & Pierce, P.L.C.

(57) ABSTRACT

There is provided a data processing device in which a ROM is mapped to an address space of a CPU only when a data storage region in a non-volatile memory is rewritten, to thereby facilitate rewriting the data storage region, and prevent a program storage region from being rewritten. A data processing device of the present invention is equipped with a CPU, a RAM, an address decoder, a flash memory and a mask ROM. When a data storage region in the flash memory is rewritten, the mask ROM is mapped while not being mapped in the other cases, whereby rewriting the data storage region is facilitated, and the program storage region is prevented from being rewritten.

4 Claims, 4 Drawing Sheets

DATA PROCESSING DEVICE

Japanese Patent Application No. 2001-385, filed Jan. 5, 2001, is hereby incorporated by reference in its entirety.

BACKGROUND OF THE INVENTION

1. Field of Invention

The present invention relates to a data processing device. More particularly, the present invention relates to a data processing device that can rewrite data stored in a non-volatile memory.

2. Prior Art

Conventionally, flash memories that store programs and data are mounted in data processing devices.

However, programs and data are present together in the same address space of a CPU (central processing unit) in a conventional data processing device. This makes it difficult to rewrite only data in the flash memory.

Also, there is another problem in that the program in the flash memory may be destroyed due to wrong operation of the CPU caused by, for example, program bugs, in cases other than the case when data in the flash memory is rewritten.

BRIEF SUMMARY OF THE INVENTION

The present invention has been made in view of the problems described above, and it is an objective of the present invention to provide a highly reliable data processing device in which a ROM which stores a program rewriting a data storage region in a non-volatile memory is mapped in an address space of a CPU when the data storage region within the non-volatile memory such as a flash memory is rewritten, and the ROM is not mapped in the address space of the CPU in the other cases, whereby rewriting the data storage region in the non-volatile memory is facilitated, and the program storage region in the non-volatile memory is not rewritten due to wrong operation and the like in cases other than the case when the data storage region in the non-volatile memory is rewritten.

To solve the above problems, a data processing device in accordance with the present invention comprises:

a CPU (central processing unit);

a rewritable non-volatile memory including a program storage region that stores first and second programs to be executed by the CPU, and a data storage region that stores data to be accessed by the CPU;

a ROM (read only memory) that stores a third program to be executed by the CPU;

a RAM (random access memory) that is mapped in a first address range in an address space of the CPU; and an address decoder which is equipped with a flag register, and maps the nonvolatile memory in a second address range in the address space of the CPU when the flag resister is in a first state and maps the ROM in the second address range in the address space of the CPU and maps the data storage region of the non-volatile memory in a third address range in the address space of the CPU when the flag resister is in a second state, wherein the first program stored in the non-volatile memory includes a routine to transfer the second program stored in the non-volatile memory to the RAM, and to branch to a head address of the second program transferred to the RAM, wherein the second program stored in the non-volatile memory includes a routine to set the flag resister of the address decoder to the second state, to call the third program stored in the ROM as a sub-routine, and to set the flag resister of the address decoder to the first state, and wherein the third program stored in the ROM includes a routine to write data stored in the RAM in the data storage region of the non-volatile memory that is mapped to the third address range.

Here, the data processing device may be a single-chip microcomputer.

A ROM which stores a program rewriting a data storage region in a non-volatile memory is mapped in an address space of a CPU when the data storage region within the non-volatile memory such as a flash memory is rewritten, and the ROM is not mapped in the address space of the CPU in the other cases, whereby rewriting the data storage region in the non-volatile memory is facilitated, and the program storage region in the non-volatile memory is not rewritten due to wrong operation and the like in cases other than the case when the data storage region in the non-volatile memory is rewritten.

DETAILED DESCRIPTION OF THE PREFERRED EMBODIMENT

A data processing device in accordance with the present invention is described in detail below with reference to the accompanying drawings.

Figure 1:
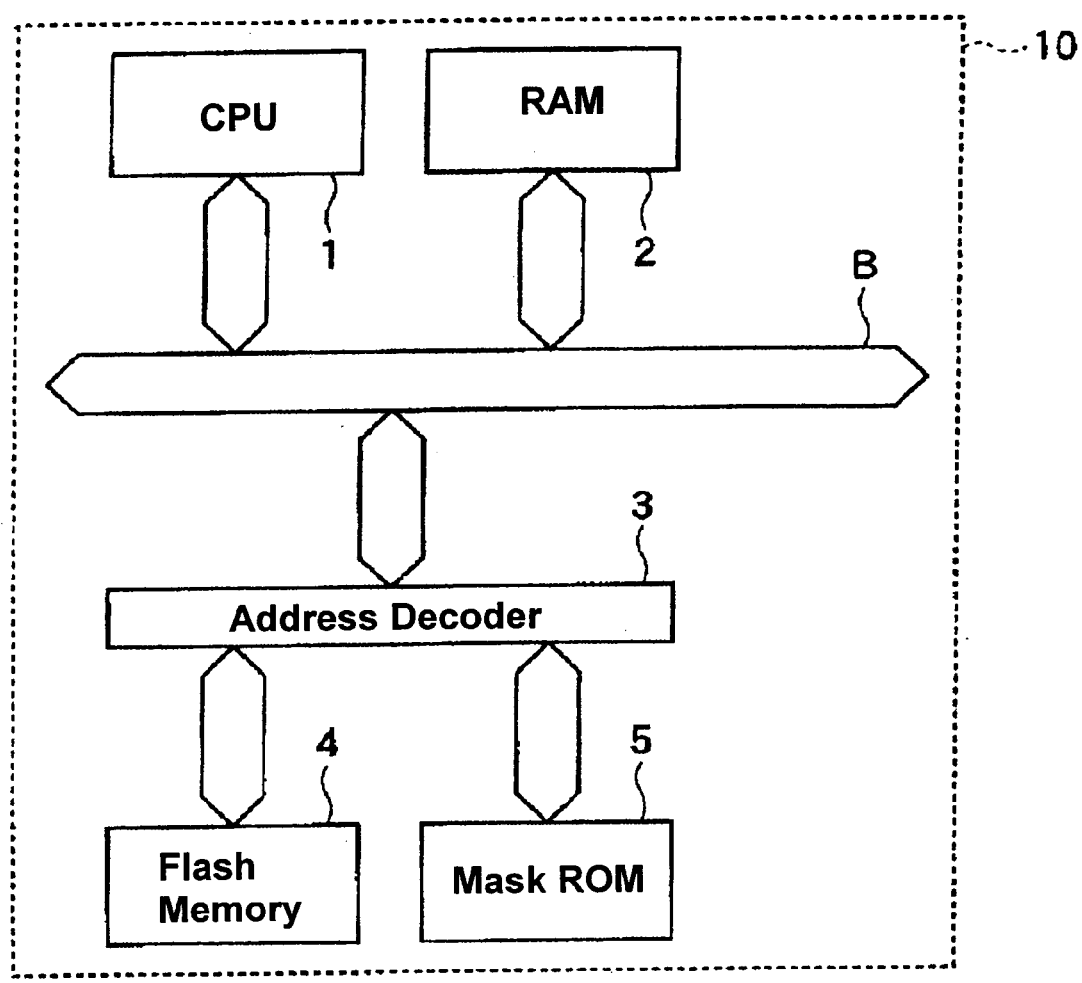
FIG. 1 schematically shows a data processing device in accordance with one embodiment of the present invention.

FIG. 1 schematically shows a data processing device in accordance with one embodiment of the present invention. Referring to FIG. 1, the data processing device of the present embodiment is described below.

In FIG. 1, the data processing device 10 in accordance with the present embodiment is equipped with a CPU 1, a RAM 2 and an address decoder 3, which are mutually connected by a bus B. Also, the data processing device 10 is equipped with a flash memory 4 and a mask ROM 5, which are connected to the address decoder 3.

The RAM 2 is mapped in an address space of the CPU 1.

The flash memory 4 includes a program storage region that stores a program to be executed by the CPU 1, and a data storage region that stores data to be accessed by the CPU 1.

The mask ROM 5 stores a program that is executed by the CPU 1.

A self-programming flag register is provided in the address decoder 3. The self-programming flag register is mapped in an address space of the CPU 1, in which "1" or "0" is set by the CPU 1.

Figure 2:
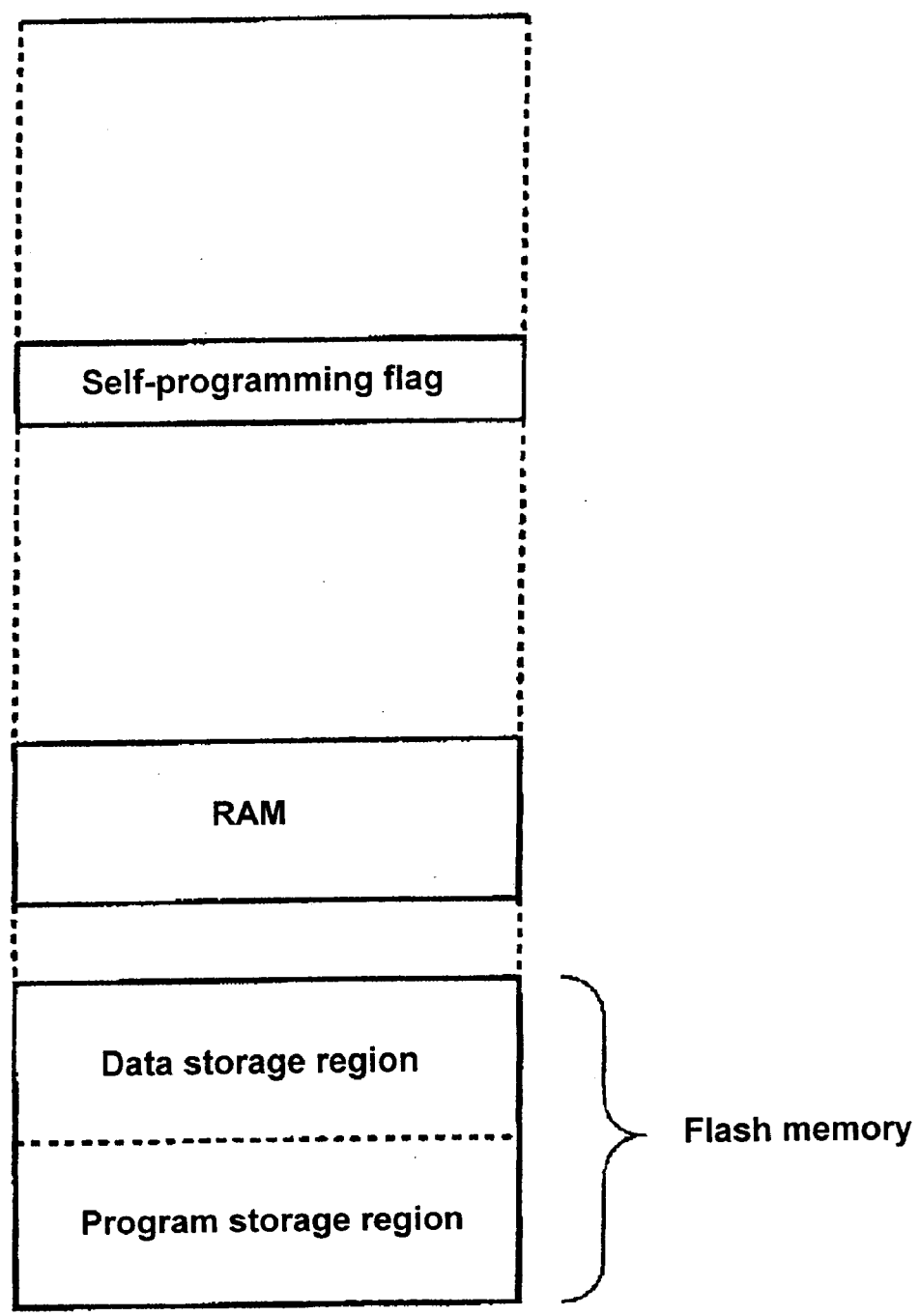
FIG. 2 shows a first memory map of the data processing device in accordance with the present invention.

When the value of the self-programming flag register is set at "1", the address decoder 3 maps the flash memory 4 in the address space of the CPU 1. FIG. 2 shows a memory map of the CPU 1 when the value of the self-programming flag register is "1". Normally, the value of the self-programming flag register is set at "1".

Figure 3:
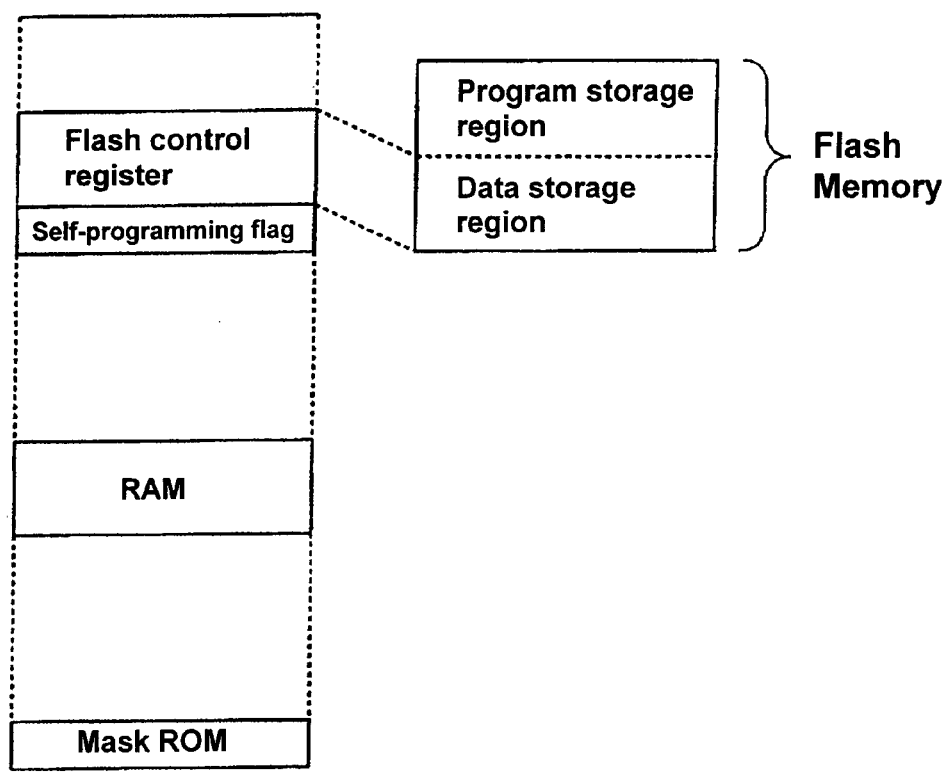
FIG. 3 shows a second memory map of the data processing device in accordance with the present invention.

Also, when the value of the self-programming flag register is set at "0", the address decoder 3 maps the mask ROM 5 in the address space of the CPU 1, and maps the data storage region of the flash memory 4 in the address space of the CPU 1 (hereafter simply referred to as "flash control register"), respectively. FIG. 3 shows a memory map of the CPU 1 when the value of the self-programming flag register is "0".

Figure 4:
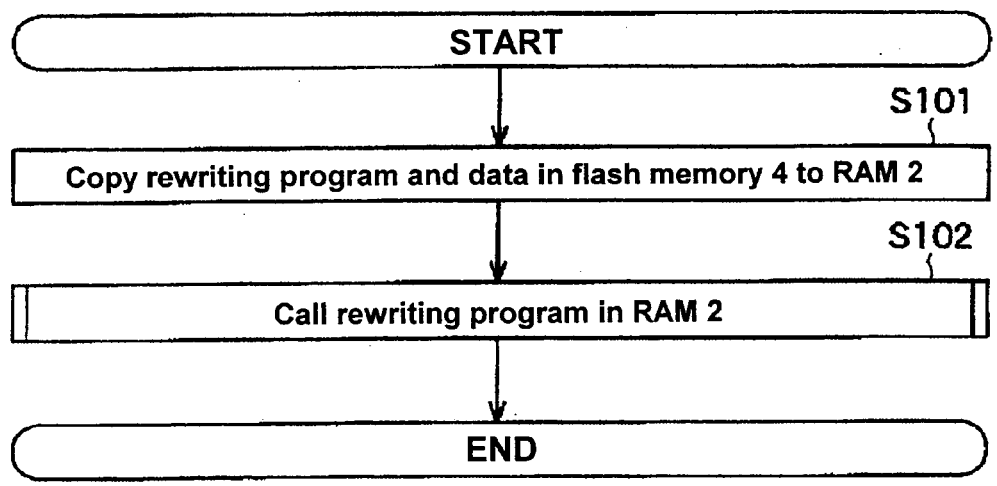
FIG. 4 shows a flow chart of an operation of the data processing device in accordance with the present invention.
Figure 5:
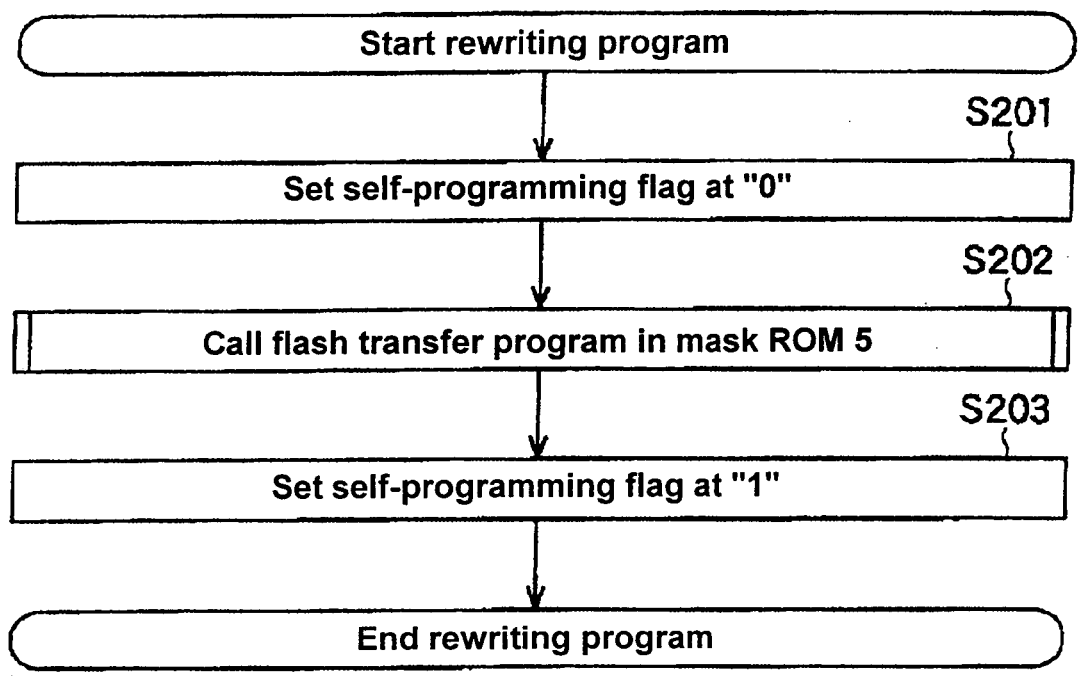
FIG. 5 shows a flow chart of an operation of the data processing device in accordance with the present invention.
Figure 6:
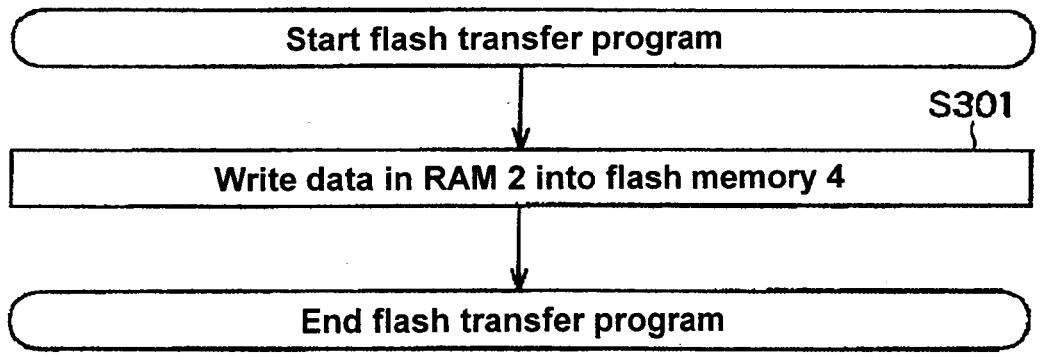
FIG. 6 shows a flow chart of an operation of the data processing device in accordance with the present invention.

Next, an operation to rewrite data stored in the data storage region in the flash memory 4 of the data processing device 10 in accordance with the present embodiment is described. FIG. 4 shows a flow chart that generally shows a process executed by the data processing device 10 for rewriting data stored in the data storage region within the flash memory 4. FIG. 5 shows a flow chart of a rewriting program execution process (S102) among the process shown in FIG. 4. FIG. 6 shows a flow chart of a flash transfer program execution process (S102) among the process shown in FIG. 5. An operation of the data processing device 10 for rewriting data stored in the data storage region within the flash memory 4 is described with reference to FIGS. 4 to 6.

Normally, the value of the self-programming flag register is set at "1", and the CPU 1 executes a control program, for instance, that is stored in the program storage region in the flash memory 4. When it is necessary to rewrite the data stored in the data storage region in the flash memory 4, the CPU 1 starts processes shown in FIGS. 4 to 6.

When a process shown in FIG. 4 is started, the CPU 1 copies a rewiring program stored in the program storage region in the flash memory 4 and data stored in the data storage region in the flash memory 4 to the RAM 2 (step S101).

Next, the CPU 1 calls the rewriting program copied in the RAM 2 in step S101 as a sub-routine (step S102).

When the rewriting program is called as a sub-routine, the CPU 1 starts the process shown in FIG. 5.

When an execution process of the rewiring program is started, the CPU 1 sets the value of the self-programming flag register at "0" (step S201). As the value of the self-programming flag is set at "0", the memory map of the CPU 1 shifts from the one shown in FIG. 2 to the one shown in FIG. 3.

Next, the CPU 1 calls a flash transfer program in the mask ROM 5 as a sub-routine (step S202).

When the flash transfer program is called as a sub-routine, the CPU 1 starts the process shown in FIG. 6.

When an execution process of the flash transfer program is started, the CPU 1 writes data at a specified address in the RAM 2 into the data storage region in the flash memory 4 through the flash control register in the address space of the CPU 1 (step S301). Then, the CPU 1 finishes the flash transfer program, and returns to step S202.

Upon returning from the flash transfer program, the CPU 1 sets the value of the self-programming flag at "1" (step S203). As the value of the self-programming flag is set at "1", the memory map of the CPU 1 shifts from the one shown in FIG. 3 to the one shown in FIG. 2. Then, the CPU 1 finishes the rewriting program, and returns to step S102.

Upon returning from the rewriting program, the CPU 1 finishes the entire process.

In the manner described above, rewriting the data stored in the data storage region in the flash memory 4 is executed.

In the manner described above, by the data processing device 10 in accordance with the embodiment of the present invention, when a data storage region within the flash memory 4 is rewritten, the mask ROM 5 that stores a program for rewriting the data storage region in the flash memory 4 is mapped in an address space of the CPU 1, and the mask ROM 5 is not mapped in the address space of the CPU 1 in other cases, whereby rewriting the data storage region in the flash memory 4 is facilitated, and the program storage region in the flash memory 4 is not rewritten due to wrong operation of the CPU 1 caused by, for example, program bugs in cases other than the case when the data storage region in the flash memory 4 is rewritten.

A data processing device in accordance with one embodiment of the present invention is described above, and the data processing device 10 may be a single-chip microcomputer.

As described above, by a data processing device in accordance with the present invention, when a data storage region within a non-volatile memory is rewritten, a ROM that stores a program for rewriting the data storage region in the nonvolatile memory is mapped in an address space of a CPU, and the ROM is not mapped in the address space of the CPU in other cases, whereby rewriting the data storage region in the non-volatile memory is facilitated, and the program storage region in the non-volatile memory is not rewritten due to wrong operation and the like in cases other than the case when the data storage region in the non-volatile memory is rewritten.

What is claimed is:

1. A data processing device comprising:
   a CPU;
   a rewritable non-volatile memory including a program storage region that stores first and second programs to be executed by the CPU, and a data storage region that stores data to be accessed by the CPU;
   a ROM that stores a third program to be executed by the CPU;
   a RAM that is mapped to a first address range in an address space of the CPU; and
   an address decoder which is equipped with a flag register, and maps the non-volatile memory to a second address range in the address space of the CPU when the flag register is in a first state and maps the ROM to the second address range in the address space of the CPU and maps the data storage region of the non-volatile memory to a third address range in the address space of the CPU when the flag register is in a second state,
   wherein the first program stored in the non-volatile memory includes a routine to transfer the second program stored in the non-volatile memory to the RAM, and to branch to a head address of the second program transferred to the RAM,
   wherein the second program stored in the non-volatile memory includes a routine to set the flag register of the address decoder to the second state, to call the third program stored in the ROM as a sub-routine, and to set the flag register of the address decoder to the first state, and
   wherein the third program stored in the ROM includes a routine to write data stored in the RAM in the data storage region of the non-volatile memory that is mapped to the third address range.

2. The data processing device according to claim 1, wherein the data processing device is a single-chip microcomputer.

3. A method of controlling a data processing device, wherein the data processing device comprises:

a CPU;

a rewritable non-volatile memory including a program storage region that stores first and second programs to be executed by the CPU, and a data storage region that stores data to be accessed by the CPU;

a ROM that stores a third program to be executed by the CPU;

a RAM that is mapped into a first address range in an address space of the CPU; and an address decoder, wherein the method comprises a step of mapping the non-volatile memory to a second address range in the address space of the CPU when the flag register is in a first state, and mapping the ROM to the second address range in the address space of the CPU and maps the data storage region of the non-volatile memory to a third address range in the address space of the CPU when the flag register is in a second state, wherein the first program stored in the non-volatile memory includes a routine to transfer the second program stored in the non-volatile memory to the RAM, and to branch to a head address of the second program transferred to the RAM, wherein the second program stored in the non-volatile memory includes a routine to set the flag register of the address decoder to the second state, to call the third program stored in the ROM as a sub-routine, and to set the flag register of the address decoder to the first state, and wherein the third program stored in the ROM includes a routine to write data stored in the RAM in the data storage region of the non-volatile memory that is mapped to the third address range.

4. The method of controlling data processing device according to claim 3, wherein the data processing device is a single-chip microcomputer.

* * * * *